United States Patent [19]

Blair

[11] 3,954,144
[45] May 4, 1976

[54] FOLDING IMPLEMENT CHAIN LIFTER

[76] Inventor: Calvin B. Blair, P.O. Box 76, Barnard, Kans. 67418

[22] Filed: Mar. 19, 1975

[21] Appl. No.: 559,898

[52] U.S. Cl. ................................ 172/311; 74/470; 172/456; 280/411 A
[51] Int. Cl.² .................... A01B 49/00; A01B 63/32
[58] Field of Search ........... 172/287, 290, 311, 316, 172/456, 458, 459, 476, 483, 490, 491, 501, 502, 503, 630, 633, 776; 280/411 R, 411 A, 412, 413; 74/470

[56] References Cited
UNITED STATES PATENTS

| | | | |
|---|---|---|---|
| 3,302,956 | 2/1967 | Sosalla | 280/411 A |
| 3,428,333 | 2/1969 | Nelson | 280/411 A |
| 3,529,674 | 9/1970 | Todd et al. | 172/311 |
| 3,548,954 | 12/1970 | Lindemann | 172/311 |
| 3,637,027 | 1/1972 | Kovar | 172/311 |
| 3,640,345 | 2/1972 | Sosalla | 172/311 |
| 3,643,742 | 2/1972 | Wellendorf | 172/316 |

Primary Examiner—Richard C. Pinkham
Assistant Examiner—Richard T. Stouffer
Attorney, Agent, or Firm—Fishburn, Gold & Litman

[57] ABSTRACT

An improved chain lifter for foldable soil conditioner apparatus of the general type characterized by an elongated, foldable wing frame for soil conditioning members which is hingably mounted transversely on the rear of a main frame, is liftable from the ground by means of a lifting tower on the main frame, and is stabilized by reinforcing chains which extend rearwardly and outwardly from the main frame to the outer ends of the wing frame. Arm members which lift the chains have one end pivotally attached to the main frame whereas the other ends of the members are secured to the reinforcing chains intermediate to the ends thereof. Resilient biasing links interconnect the arm members with the upright lever of the lifting tower. Accordingly, the arms are pivoted upwardly and forwardly by means of the resilient biasing links when the wing frame is folded to a transport position, hence lifting the slackened reinforcing chains off the ground.

9 Claims, 3 Drawing Figures

FOLDING IMPLEMENT CHAIN LIFTER

BACKGROUND OF THE INVENTION

The present invention pertains to farm implements and more particularly to foldable soil conditioners which have an elongated foldable wing frame, with attached soil conditioning members, which is hingably attached transversely to the rear of a main frame, and with the wing frame being stabilized during a soil conditioning operation by means of elongated flexible reinforcing members, such as chains, which extend outwardly and rearwardly from the main frame to the outer ends of the wing frame. More specifically, the present invention pertains to improved apparatus for automatically lifting the flexible reinforcing members off the ground when they go slack during folding the wing frame from a soil conditioning position to a transport position.

Soil conditioning implements of the type just described have a relatively large width and have become practical in view of the large tractors which are now available for towing them. The wing frames are foldable to reduce the width of the implement during transportation from one location to another, hence permitting passage through gates, pulling along highways, etc.

The wing frame, when unfolded, is stabilized against rearward deflection by means of flexible reinforcing members, such as chains or cables, which are secured to the outer ends of the wing frame and at a position near the tongue of the implement. Such chains or cables become slack when the wing frame is folded to a transport position and hence tend to drag on the ground, become tangled, and will snag on obstacles which would otherwise be cleared during transportation. This problem has been recognized, and one solution is proposed by Kovar, in U.S. Pat. No. 3,637,027, who relies on chain lifting arms 108 which are caused to pivot for lifting of the reinforcing chains 104 by pressure exerted on the arms by a first linkage member 76, but not until the outer members of the wings are folded forwardly and inwardly with respect to the main frame of the implement. Therefore, in accordance with Kovar's disclosure, a customized and rather complex linkage arrangement must be associated with the outer wings in order to cooperate with the lifting apparatus for taking up slack in the chains.

A principle object of the present invention is, therefore, to provide an improved lifting apparatus for flexible reinforcing members on foldable soil conditioners of the type herein described whereby slack in the flexible members is automatically taken up when the implement is folded for transport.

Another object is to provide an improved lifting apparatus for flexible reinforcing members which can be simply and inexpensively installed on foldable soil conditioners of the type herein described in order to apply an upward tension on the flexible members and thus take up slack therein whenever slackening occurs.

These and other objects and advantages of the present invention will become more fully apparent from the following description and the appended claims.

SUMMARY OF THE INVENTION

The present invention is an improvement in foldable soil cultivators of the type which include a foldable wing frame hingably attached to the rear end of a main frame and wherein elongated, flexible reinforcing members extend rearwardly and outwardly from the main frame to the outer ends of the wing frame.

In accordance with the present invention, a lever pivotally connected to the main frame is interconnected with a pivotable arm member by means of a resilient biasing link to provide means for taking up slack in a flexible reinforcing member. One end of the arm member is pivotally attached at one end to the main frame whereas the other end of the arm member is secured to at least one of the flexible reinforcing members. The arm member is urged to pivot by the resilient biasing member in a direction which results in an upward tugging on a flexible reinforcing member attached to the arm so that slack is automatically removed whenever it occurs, especially when the wing frame is being folded for transport.

DESCRIPTION OF PREFERRED EMBODIMENTS

Figure 1:
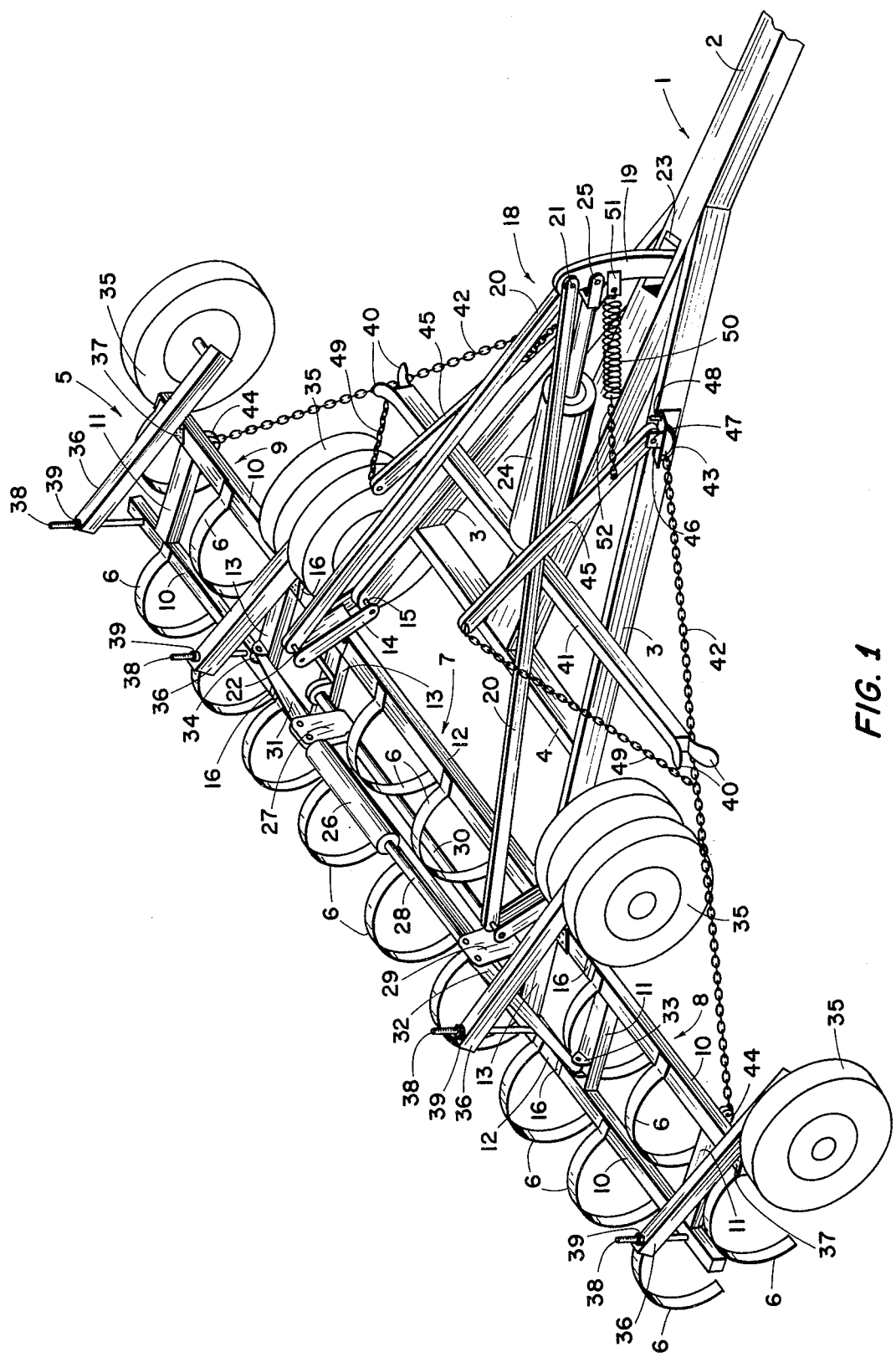
FIG. 1 is an isometric view of a folding implement in an operating position and having the improved lifting apparatus for the flexible reinforcing members installed thereon.

In FIG. 1, the folding cultivator implement is shown in the fully extended, operating position. The main frame of the cultivator, generally represented at 1, is normally horizontally disposed and includes a tongue 2, two sides 3 which attach to the front end of the tongue and diverge toward the rear of the frame, and a cross-brace 4 for the sides. The rear end of the tongue is welded to the cross-brace 4 whereas the forward end is adapted for attachment to a towing vehicle, not shown.

An elongated wing frame, generally represented at 5, is pivotally attached transversely to the rear end of the main frame and is disposed horizontally in the operating position. Curved soil conditioning members 6 are affixed to the wing frame and extend downwardly therefrom. The wing frame has a central wing member, generally represented at 7, and outer wing members, generally represented at 8 and 9. The outer wing members include a pair of spaced side members 10 which are joined together by crossmembers 11. Similarly, central wing member 7 includes a pair of spaced side members 12 which are joined by crossmembers 13.

Figure 2:
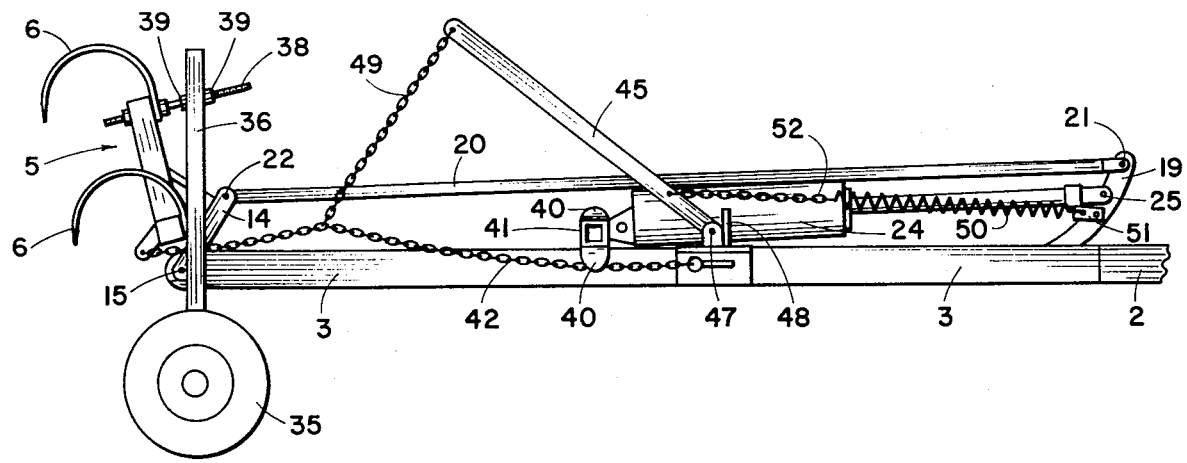
FIG. 2 is a side view of the apparatus of FIG. 1 and shows the wing frame raised upward to an intermediate position.
Figure 3:
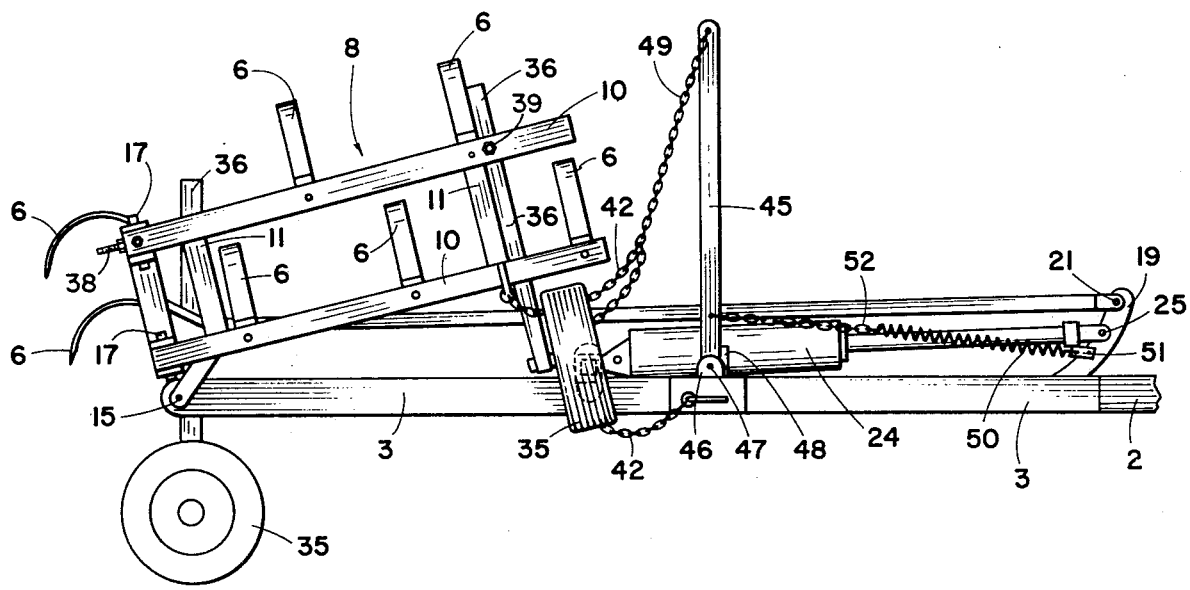
FIG. 3 is a side view of the apparatus of FIG. 1 and shows the wing frame folded forwardly and inwardly to a transport position.

Pivotal links 14 are rigidly attached to the central wing member. The rear ends of the sides 3 of the main frame are attached to a lower pivot point on the links 14 by means of pivot pins 15. The entire wing frame is thus hinged on the pins 15 to swing upward and forward, with respect to the main frame, to assume a substantially vertical position. This is an intermediate position, as shown in FIG. 2, which is effected prior to complete folding of the wing frame to a transport position. The outer wing members 8 and 9 are hingably attached to the central wing member at pivot points, represented at 16, by means of pivot pins 17 which are shown in FIG. 3. Accordingly, the outer wing members are arranged to hinge inwardly and forwardly with respect to the main frame to assume a transport position, as shown in FIG. 3, after the entire wing frame has first been raised to the intermediate position.

Raising of the wing frame to an intermediate position is accomplished by means of a lifting tower 18 having an upright lever 19 pivotally connected at its lower end to the tongue 2 at the front end of the main frame. The lifting tower also includes interconnecting links 20 between the lever 19 and the wing frame. As can be seen from FIGS. 1 and 2, the interconnecting links 20 are pivotally attached at the front end to lever 19 by means of a pivot pin 21, whereas the rear ends are connected to pivotal links 14 at an upper pivot point by means of pivot pins 22.

As shown in the drawings, lever 19 pivots back and forth in relation to the longitudinal axis of the main frame 1, a slot 23 being provided in tongue 2 to permit such pivotal motion. A hydraulic cylinder 24, having the rear end anchored to the main frame and which can be operated from the towing vehicle, applies thrust to a shaft which is pivotally attached to a lever 19 by means of a pivot pin 25. In FIG. 1, the lever 19 is in a rearward position whereby the wing frame remains substantially horizontally disposed for conditioning of soil by means of members 6. When lever 19 is pushed forward by means of the hydraulic cylinder 24 and assumes a position as is illustrated in FIGS. 2 and 3, interconnecting links 20 pull against the pins 22 in pivot links 14 and cause the entire wing frame to pivot upward and forward around pins 15 in the pivot links.

Once the wing frame 5 has been raised to an intermediate position as illustrated in FIG. 1, forward and inward folding of the outer wings 8 and 9 to the transport position shown in FIG. 3 is accomplished by means of a second hydraulic cylinder 26. One end of the hydraulic cylinder 26 is affixed to a connecting link 27 whereas the outer end of the driven shaft 28 of cylinder 26 is attached to another connecting link 29. Upon operation of the hydraulic cylinder, the lower ends of connecting links 27 and 29 ride over a track 30 in the form of a rigid rod which is affixed at each end to crossmembers 13 on the central wing member. Links 31 and 32 have their inner ends pivotally attached to connecting links 27 and 29, respectively. The outer ends of links 31 and 32 are pivotally connected to crossmembers 11 by pivot joints 33 and 34 on outer wing members 8 and 9, respectively. Upon withdrawing shaft 28 into hydraulic cylinder 26, connecting links 27 and 29 are pulled toward each other at an even rate along track 30, thus pulling the outer wing members 8 and 9 by means of links 31 and 32 so that the outer wings pivot inward and forward as shown in FIG. 3.

The cultivator is provided with wheels 35 to facilitate movement over the ground when conditioning the soil and when transporting the cultivator from one location to another. As shown in the drawings, the wheels 35 are mounted on struts 36 which are attached to side members 10 and 12 by means of hinges 37. Threaded rods 38 are affixed to side members 10 and extend upward and through the struts.

The distance of the wing frame above the ground can be adjusted by moving the rear ends of the wheel struts up and down on the threaded rods, followed by tightening of lock nuts 39 on the upper and lower sides of the struts. When the outer wing members 8 and 9 are folded forwardly and inwardly, the wheels 35 attached thereto come to rest against pads 40 on each end of a wheel bracing member 41 which straddles the main frame and is affixed to sides 3.

Elongated flexible reinforcing members 42 extend rearwardly and outwardly from the main frame 1 to the outer ends of the wing frame 5. As shown in the drawing, the flexible reinforcing members are chains attached to links 43 on the forward end of the main frame while being attached to horns 44 on the outer ends of side members 10 of wing members 8 and 9. Alternatively, the flexible reinforcing members can be cables or jointed rods having swivels intermediate their ends, and can be attached to the main frame at a point which is somewhat more toward either the front or the rear of the main frame than is illustrated in the drawings. As a matter of convenience, and without intending to limit the scope of the present invention, the elongated flexible reinforcing members 42 will hereafter be referred to as "reinforcing chains."

Arm members 45 for lifting the chains are pivotally secured at their inner ends to the main frame by means of pivot joints 46 and pivot pins 47. Forward movement of the arms 45 beyond a vertical position is prevented by means of arm stops 48. The outer ends of the arms 45 are secured to the reinforcing chains 42 by means of interconnecting flexible members 49, e.g. short lengths of chain. Resilient biasing links 50 interconnect the chain lifting arms 45 and the lever 19 of the lifting tower. As shown in the drawing, the resilient biasing links 50 are helical springs having one end connected to a spring clip 51 mounted on tower 19 whereas the other end of the spring is attached to a section of chain 52 which extends to an arm member 45 and is attached thereto. Alternatively, the springs 50 can be longer than shown for direct connection to arm 45, thereby dispensing with chains 52. In addition, elastic cords or other suitable resilient biasing links can be substituted for helical springs, and it will also be understood that biasing can be accomplished with a biasing link under compression as well as one under tension.

In the embodiment shown in the drawings, it can be seen that the arm members 45 are pivotally connected to the sides 3 of the main frame rearwardly of the lifting tower lever 19, and that the reinforcing chains 43 attach to the main frame at links located below the pivot joints 46. It can also be seen that arms 45 incline rearward with respect to the main frame when the soil conditioner is in the normal operating position shown in FIG. 1 or the intermediate position shown in FIG. 2. More specifically, the degree of rearward inclination of the arm members 45 is greatest when the soil conditioner is in the operating position, and is somewhat less when in the intermediate position.

When the soil conditioner is completely folded to the transport position, the arms 45 are pulled to a fully vertical position by springs 50 to effect hoisting of the chains 42 as high as possible when they go slack upon forward and inward folding of the outer wings 8 and 9. It can therefore be seen that tension is continuously applied to arms 45 by springs 50 when the wing frame is in the operating, intermediate and transporting positions, and the arms 45 are thus urged to pivot upward and toward the front end of the main frame, or more specifically toward the lifting tower lever 19. Excessive forward pivoting of arms 45 is restrained when the wing frame is in the operating and the intermediate positions by chains 49 which interconnect the arms and the reinforcing chains 50, i.e. when the wing frame is in these positions the arms will pivot upwardly and forwardly only insofar as slack exists in a chain attached to the arm, and to a degree corresponding to the amount of slack. As was previously indicated, forward rotation of the arms 45 beyond a fully upright position is advantageously prevented by arm stops 48 to provide maximum lifting of the reinforcing chains by the arms.

Attention will now be directed to an important coactive relationship which occurs between the upright lever 19 of the lifting toner, the biasing springs 50, and the pivoted arm members 45. It should be noted from FIG. 1 that when the soil conditioner is in an operating condition, the chains are installed in a taut condition in order to adequately stabilize the outer wings members against rearward deflection, and that the lifting tower lever is in a rearward position. As a consequence, no more stretching tension need exist on springs 50 than is necessary to pivot arms 45 forwardly until slack is pulled out of chains 49. From FIG. 2 it can be seen that a substantial stretching tension on springs 50 does not occur until the lever 19 of the lifting tower is moved forward for raising the wing frame assembly to the intermediate position. Accordingly, forward movement of the lever 19 places the springs 50 under considerable stretching tension since forward pivoting of the arms 45 is restrained in the intermediate position whereas little or no slackening of the chains 40 occurs. However, this tensioning of the springs 50, which occurs when the wing frame is moved to the intermediate position, causes forward and upward pivoting of the arm members 45 when the outer wing members 8 and 9 are folded forward and inward to the transport position, hence effecting lifting of the slackened chains. Once the arms 45 have been pivoted to a full upright position and the chains 42 have been lifted off the ground, stretching of the springs is largely diminished and only a relatively slight tension is in fact required to keep the arms 45 upright and hold the chains off the ground. It will thus be appreciated that springs 50 are subjected to substantial stretching tension only during transition of the wing frame from an operating position to a transport position, or vice versa, and hence only occasionally and momentarily.

The present invention has been described with reference to use of two lifting arm members 45 for removing slack from the reinforcing chains 42, but it will be appreciated that more than one such arm can be employed to lift one chain, or that more than two lifting arms can be used in conjunction with more than two chains, or that only one lifting arm can be used for lifting more than one chain. Similarly, the lever such as 19 need not necessarily be the lever of a lifting tower since a separate, hand operated lever can also be used. In addition, more than one lever such as 19 can be used, as can more than two or only one interconnecting link 20.

It will thus be appreciated that the folding implement chain lifter disclosed herein can be used to advantage whether the wing frame is folded by hand or by powered means such as hydraulic cylinders, since only the lever such as 19 need be actuated directly for effective lifting of the chains off the ground.

Although the present invention has been described with reference to particular apparatus, arrangements of apparatus, apparatus function and operating conditions, it will nonetheless be understood that still other embodiments will become apparent which are within the spirit and scope of the invention defined in the following claims.

What is claimed and desired to secure by Letters Patent is:

1. A foldable soil cultivator comprising:

a main frame with a front end and a rear end, a central wing member hingedly connected to said main frame rear end for pivotal lifting from a horizontal operational position to a generally vertical transport position, an outer wing member hingedly connected to said central wing member and means for folding said outer wing member forwardly toward said main frame when said central wing member is in said transport position, an upwardly projecting lever pivotally connected to said main frame for pivotal movement forwardly and rearwardly thereof, an interconnecting link connected to said main frame lever and one of said wing members and pivotally lifting said wing members upon pivotal movement of said main frame lever forwardly of said main frame, motive means connected to said main frame and said main frame lever and operable to selectively pivot said main frame lever, an elongated, flexible reinforcing member connected at one end thereof to said main frame and extending rearwardly and outwardly from said main frame, said flexible member being connected at the other end thereof to said outer wing member, an arm member having separated ends, one of said arm member ends being pivotally attached to said main frame for pivoting the other of said arm member ends between a lower elevation and a higher elevation, said arm member other end being connected to said flexible member intermediate said flexible member ends, said arm member being positioned to lift said flexible member as said arm member other end pivots to said higher elevation, and a resilient biasing link means connected to said lever and said arm member, said biasing link means applying resilient force to said arm member, said resilient force being increased by said biasing link means during the lifting of said wing members to urge said flexible member upwardly simultaneously with the lifting of said wing members and prior to the folding of said outer wing member.

2. The cultivator as set forth in claim 1 wherein said outer wing member, flexible reinforcing member, arm member, and biasing link means are duplicated on both sides of said main frame and both of the biasing link means are connected to said lever.

3. Apparatus as in claim 1 wherein said arm member inclines rearwardly of said main frame when said wing frames are in said operational position and is generally vertical when said wing frames are in said transport position and said outer wing member is folded forwardly.

4. Apparatus as in claim 1 wherein said motive means is an hydraulic cylinder.

5. Apparatus as in claim 1 and including an interconnecting flexible member which extends from said arm member other end to said reinforcing member.

6. Apparatus as in claim 1 wherein said reinforcing member is a chain.

7. Apparatus as in claim 1 wherein said resilient biasing link means includes a tensile spring.

8. Apparatus as in claim 1 and including wheels associated with said wing members and on which said main frame rear end is movably supported above the ground.

9. Apparatus as in claim 1 wherein said motive means is a first hydraulic cylinder and including a second hydraulic cylinder associated with said wing members for folding said outer wing members.

* * * * *